(12) United States Patent
Bondu

(10) Patent No.: US 8,960,253 B2
(45) Date of Patent: Feb. 24, 2015

(54) TIRE BEAD FOR A HEAVY CIVIL ENGINEERING VEHICLE

(75) Inventor: Lucien Bondu, La Roche Noire (FR)

(73) Assignees: Compagne Generale des Etablissements Michelin, Clermont-Ferrand (FR); Michelin Recherche et Technique S.A., Granges Paccet (CH)

( * ) Notice: Subject to any disclaimer, the term of this patent is extended or adjusted under 35 U.S.C. 154(b) by 301 days.

(21) Appl. No.: 13/515,206

(22) PCT Filed: Dec. 7, 2010

(86) PCT No.: PCT/EP2010/069076
§ 371 (c)(1),
(2), (4) Date: Sep. 11, 2012

(87) PCT Pub. No.: WO2011/070017
PCT Pub. Date: Jun. 16, 2011

(65) Prior Publication Data
US 2013/0192737 A1    Aug. 1, 2013

(30) Foreign Application Priority Data
Dec. 9, 2009 (FR) .................................... 09 58780

(51) Int. Cl.
*B60C 15/00* (2006.01)
*B60C 15/06* (2006.01)

(52) U.S. Cl.
USPC ............ 152/539; 152/541; 152/546; 152/547

(58) Field of Classification Search
USPC ............................................... 152/539–547
See application file for complete search history.

(56) References Cited

U.S. PATENT DOCUMENTS

| 4,842,033 A * | 6/1989 | Nguyen ........................ 152/541 |
| 5,131,447 A * | 7/1992 | Nakagawa et al. ........... 152/543 |
| 5,196,077 A | 3/1993 | Kaga |
| 2009/0056851 A1 * | 3/2009 | Maruoka ....................... 152/543 |

FOREIGN PATENT DOCUMENTS

| FR | 2 928 104 |   | 9/2009 |
| JP | 58-403 | * | 1/1983 |
| JP | 61-232905 | * | 10/1986 |
| JP | 1-122709 | * | 5/1989 |
| JP | 8-175130 | * | 7/1996 |

(Continued)

*Primary Examiner* — Justin Fischer
(74) *Attorney, Agent, or Firm* — Cozen O'Connor

(57) ABSTRACT

A technique for improving the durability of the beads of a radial tire for a heavy vehicle of the civil engineering type, by reducing the rate of spread of cracks initiated at the turned-back end of carcass reinforcement and the spread through the coating, edge-binding and filler polymer materials. A transition element (25), made of a transition polymer material, is at least partially in contact, on its axially external face, with the edge-binding polymer material (22) and, on its axially internal face, with a filler polymer material (23b), the radially external (E25) and radially internal (I25) ends of the transition element are respectively radially on the outside of and radially on the inside of the end of the turned-back portion of carcass reinforcement, and the elastic modulus at 10% elongation of the transition polymer material is somewhere between the respective elastic moduli at 10% elongation of the edge-binding polymer material and of the filler polymer material with which the transition element is in contact.

8 Claims, 2 Drawing Sheets

(56) References Cited

FOREIGN PATENT DOCUMENTS

| | | |
|---|---|---|
| JP | 09-99715 | 4/1997 |
| JP | 9 175122 | 7/1997 |
| JP | 2000-301919 | * 10/2000 |
| JP | 2004-82785 | * 3/2004 |
| JP | 2006 015951 | 1/2006 |

* cited by examiner

TIRE BEAD FOR A HEAVY CIVIL ENGINEERING VEHICLE

RELATED APPLICATIONS

This is a U.S. National Phase Application under 35 USC 371 of International Application PCT/EP2010/069076 filed on Dec. 7, 2010.

This application claims the priority of French Application No. 09/58780 filed Dec. 9, 2009, the entire content of which is hereby incorporated by reference.

FIELD OF THE INVENTION

The present invention relates to a radial tire intended to be fitted to a heavy vehicle of the civil engineering type.

Although not restricted to this type of application, the invention will be described more specifically with reference to a radial tire intended to be mounted on a dumper, which is a vehicle that carries material dug out of quarries or open-cast mines. The nominal diameter of the rim of such a tire, within the meaning given by the European Tire and Rim Technical Organization or ETRTO, is equal at minimum to 25".

BACKGROUND OF THE INVENTION

The following meanings apply in what follows:

"Meridian plane" is a plane containing the axis of rotation of the tire.

"Equatorial plane" is the plane passing through the middle of the tread surface of the tire and perpendicular to the axis of rotation of the tire.

"Radial direction" is a direction perpendicular to the axis of rotation of the tire.

"Axial direction" is a direction parallel to the axis of rotation of the tire.

"Circumferential direction" is a direction perpendicular to a meridian plane.

"Radial distance" is a distance measured at right angles to the axis of rotation of the tire and from the axis of rotation of the tire.

"Axial distance" is a distance measured parallel to the axis of rotation of the tire and from the equatorial plane.

"Radially" means in a radial direction.

"Axially" means in an axial direction.

"Radially on the inside of or radially on the outside of" means at a shorter, or longer, radial distance.

"Axially on the inside of or axially on the outside of" means at a shorter, or longer, axial distance.

A tire comprises two beads that provide the mechanical connection between the tire and the rim on which it is mounted, the beads being respectively joined, by two sidewalls to a tread intended to come into contact with the ground via a tread surface.

A radial tire more specifically comprises a reinforcement comprising a crown reinforcement, radially on the inside of the tread, and a carcass reinforcement, radially on the inside of the crown reinforcement.

The carcass reinforcement of a radial tire for a heavy vehicle of the civil engineering type usually comprises at least one carcass reinforcement layer made up of metal reinforcing elements coated with a coating polymer material. The metal reinforcing elements are substantially parallel to one another and make an angle of between 85° and 95° with the circumferential direction. The carcass reinforcement layer comprises a main portion, that joins the two beads together and is wound, in each bead, around a bead wire core. The bead wire core comprises a circumferential reinforcing element usually made of metal, surrounded by at least one material which, nonexhaustively, may be made of polymer or textile. The winding of the carcass reinforcement layer around the bead wire core goes from the inside towards the outside of the tire to form a turned-back portion of carcass reinforcement comprising an end. The turned-back portion of carcass reinforcement, in each bead, anchors the carcass reinforcement layer to the bead wire core of that bead.

The end of the turned-back portion of carcass reinforcement is, on its two respectively axially internal and axially external faces, covered by an edge-binding element made of an edge-binding polymer material usually of the same chemical composition as the coating polymer material but which can be a different material. The edge-binding element thus constitutes an additional thickness of polymer coating material at the end of the turned-back portion of carcass reinforcement.

Each bead also comprises a filler element extending the bead wire core radially outwards. The filler element, in any meridian plane, has a substantially triangular cross section and is made of at least one filler polymer material. The filler element may be made of a radial stack of at least two filler polymer materials in contact along a contact surface that intersects any meridian plane along a meridian line. The filler element axially separates the main portion of carcass reinforcement from the turned-back portion of carcass reinforcement.

A polymer material, after curing, is mechanically characterized by tensile stress-deformation characteristics that are determined by tensile testing. This tensile testing is performed by the person skilled in the art on a test specimen, in accordance with a known method, for example in accordance with international standard ISO 37, and under normal temperature (23±2° C.) and moisture (50±5% relative humidity) conditions defined by international standard ISO 471. The tensile stress measured for a 10% elongation of the test specimen is known as the elastic modulus at 10% elongation of a polymer material and is expressed in mega pascals (MPa).

A polymer material, after curing, is also mechanically characterized by its hardness. Hardness is notably defined by the Shore A hardness determined in accordance with ASTM D 2240-86.

As the vehicle drives along, the tire, mounted on its rim, inflated and compressed under the load of the vehicle, is subjected to bending cycles, particularly at its beads and its sidewalls.

The bending cycles lead to variations in curvature combined with variations in tension of the metal reinforcing elements in the main portion of carcass reinforcement and the turned-back portion of carcass reinforcement.

The bending cycles in particular lead to stresses and deformations in the coating, edge-binding and filler polymer materials situated in the immediate vicinity of the end of the turned-back portion of carcass reinforcement and which, over time, are likely to lead to degradation of the tire requiring it to be replaced.

More specifically, the stresses and deformations in the immediate vicinity of the end of the turned-back portion of carcass reinforcement lead to the spread of cracks initiated at the end of the turned-back portion of carcass reinforcement, especially when the reinforcing elements are made of metal.

According to the inventors, the initiation of cracks results chiefly from a lack of adhesion between the ends of the metal reinforcing elements of the turned-back portion of carcass reinforcement and the coating, edge-binding or filler polymer materials in contact with the said ends. The increase in bead temperature, during the bending cycles, accentuates the lack of adhesion that already exists in the new tire.

The cracks spread through the coating, edge-binding and filler polymer materials and lead to degradation of the bead, and therefore failure of the tire. The rate at which the cracks spread is dependent firstly on the amplitude and frequency of the stress and strain deformation cycles and secondly on the respective rigidities of the coating, edge-binding and filler polymer materials in the crack zone.

Document U.S. Pat. No. 3,921,693 has already described, in the case of a tire with a radial carcass reinforcement the reinforcing elements of which are made of metal, beads which have a design aimed at preventing cracks at the end of the turned-back portion of carcass reinforcement. In the technical solution proposed, the end of the turned-back portion of carcass reinforcement is covered with a polymer material the Shore A hardness of which is higher than that of the filler polymer material or materials.

Document U.S. Pat. No. 4,086,948 has also described with a view to increasing the life of a radial tire for a heavy vehicle, a tall turned-back portion of carcass reinforcement, which means the end of which is radially on the outside of the straight line passing through the axially outermost points of the sidewalls of the tire. In addition, the polymer material with the metal reinforcing elements of the carcass reinforcement are coated has a Shore A hardness and an elastic modulus at 300% elongation which are respectively higher than the Shore A hardness and than the elastic modulus at 300% elongation of the filler polymer material.

Finally, document U.S. Pat. No. 5,056,575 describes a tire bead for a heavy vehicle, such as trucks and buses, which allows a reduction in deformations and slows the spread of cracks through the polymer material near the end of the turned-back portion of carcass reinforcement so as to increase the durability of the bead. The technical solution proposed consists of a bead that has three filler polymer materials of which the elastic moduli at 100% elongation decrease from the filler polymer material adjacent to the turned-back portion of carcass reinforcement which is the radially outermost one, to the filler polymer material adjacent to the bead wire core which is the radially innermost one.

SUMMARY OF THE INVENTION

One object of the invention is to improve the durability of the beads of a radial tire for a heavy vehicle of the civil engineering type, by reducing the rate of spread of cracks initiated at the turned-back end of carcass reinforcement and the spread through the coating, edge-binding and filler polymer materials.

According to one aspect of the invention, this objective has been achieved by:

a tire for a heavy vehicle of the civil engineering type, comprising two beads intended to come into contact with a rim, a carcass reinforcement comprising at least one carcass reinforcement layer made up of metal reinforcing elements coated in a coating polymer material, the carcass reinforcement layer comprising a main portion which, in each bead, is wound from the inside towards the outside of the tire, around a bead wire core to form a turned-back portion of carcass reinforcement comprising an end covered by an edge-binding element made of an edge-binding polymer material, each bead comprising a filler element extending the bead wire core radially outwards, the filler element having, in any meridian plane, a substantially triangular cross section and being made of at least one filler polymer material, the filler polymer material in contact with the edge-binding element having an elastic modulus at 10% elongation that is less than the elastic modulus at 10% elongation of the edge-binding polymer material, a transition element, made of a transition polymer material, being at least partially in contact, on its axially external face, with the edge-binding polymer material and, on its axially internal face, with a filler polymer material, the radially external and radially internal ends of the transition element being respectively radially on the outside of and radially on the inside of the end of the turned-back portion of carcass reinforcement, and the elastic modulus at 10% elongation of the transition polymer material is somewhere between the respective elastic moduli at 10% elongation of the edge-binding polymer material and of the filler polymer material with which the transition element is in contact.

According to an embodiment of the invention, it is advantageous to have a transition element, made of a transition polymer material, that is at least partially in contact, on its axially external face, with the edge-binding polymer material and, on its axially internal face, with a filler polymer material. This is because adding a transition element between the edge-binding element and the axially internal filler material at the end of the turned-back portion of carcass reinforcement makes it possible locally, in the polymer materials situated in the vicinity of the end of the turned-back portion of carcass reinforcement, to limit the levels of stresses and deformations on which the rate of spread of cracks initiated at the end of the turned-back portion of carcass reinforcement is dependent.

It is also advantageous to have the radially external and radially internal ends of the transition element respectively radially on the outside of and radially on the inside of the end of the turned-back portion of carcass reinforcement. Radially positioning the end of the turned-back portion of carcass reinforcement between the two, respectively radially external and radially internal, ends of the transition element ensures contact between the end of the turned-back portion of carcass reinforcement and the transition element given the tolerances on the radial positioning of the end of the turned-back portion of carcass reinforcement which are inherent to the method of manufacture.

Finally, the elastic modulus at 10% elongation of the transition polymer material is advantageously somewhere between the respective elastic moduli at 10% elongation of the edge-binding polymer material and of the filler polymer material with which the transition element is in contact. The progressive decrease in elastic moduli at 10% elongation when moving from the edge-binding polymer material to the transition polymer material, and to the filler polymer material, gives a decreasing and gradual rigidity gradient, which makes it possible to reduce the stresses and deformations at the end of the turned-back portion of carcass reinforcement and therefore to slow the spread of cracks.

The greater the difference between the respective elastic moduli at 10% elongation of the edge-binding polymer material and of the filler polymer material, the more significant an advantage afforded by an elastic modulus at 10% elongation of the transition polymer material. In the studied example of a tire according to the invention, the elastic modulus at 10% elongation of the edge-binding polymer material is equal to 1.6 times the elastic modulus at 10% elongation of the filler polymer material.

According to one embodiment of the invention, the thickness of the transition element is at least equal to 0.25 times the distance between the end of the turned-back portion of carcass reinforcement and the main portion of carcass reinforcement. What is termed the thickness of the transition element is the constant thickness of the transition element measured outside of the tapering regions at the ends of the transition element. The distance between the end of the turned-back portion of carcass reinforcement and the main portion of carcass reinforcement is the distance measured, along the straight line that passes through the end of the turned-back portion of carcass reinforcement and is perpendicular to the main portion of carcass reinforcement, between the axially internal generatrix of the reinforcing elements in the turned-back portion of carcass reinforcement and the axially external generatrix of the reinforcing elements in the main portion of carcass reinforcement. This minimum thickness of the transition element makes it possible to establish a minimum rigidities gradient, allowing the rate of spread of cracks to be reduced.

The thickness of the transition element is advantageously at most equal to 0.60 times the distance between the end of the turned-back portion of carcass reinforcement and the main portion of carcass reinforcement. This is because the thermal dissipation of the transition polymer material is greater than that of the filler polymer material because of its higher elastic modulus at 10% elongation. As a result, too high a volume of transition polymer material leads to an increase in bead temperature that is damaging to its life, hence the importance of placing an upper limit on the thickness of the transition element.

It is advantageous for the distance between the radially external end of the transition element and the end of the turned-back portion of carcass reinforcement to be at least equal to 2 times the distance between the end of the turned-back portion of carcass reinforcement and the main portion of carcass reinforcement. This distance is measured between the straight line that, passing through the radially external end of the transition element and parallel to the straight line passing through the end of the turned-back portion of carcass reinforcement and perpendicular to the main portion of carcass reinforcement, and the straight line passing through the end of the turned-back portion of carcass reinforcement and perpendicular to the main portion of carcass reinforcement. This minimum distance guarantees that there will be the presence of the transition element axially on the outside of the end of the turned-back portion of carcass reinforcement, the radial position of which is likely to vary as a result of the manufacturing tolerances.

It is also advantageous for the distance between the radially external end of the transition element and the end of the turned-back portion of carcass reinforcement to be at most equal to 4 times the distance between the end of the turned-back portion of carcass reinforcement and the main portion of carcass reinforcement. The portion of transition element beyond this maximum distance, firstly increases the dissipation of heat in the bead, which is damaging to the bead, without being of any use in compensating for the uncertainty regarding the radial positioning of the end of the turned-back portion of carcass reinforcement, thus resulting in a needless additional cost of transition polymer material.

Another advantageous embodiment of the invention is to have the distance between the radially internal end of the transition element and the end of the turned-back portion of carcass reinforcement at least equal to 2 times the distance between the end of the turned-back portion of carcass reinforcement and the main portion of carcass reinforcement. This distance is measured between the straight line, passing through the radially internal end of the transition element and parallel to the straight line passing through the end of the turned-back portion of carcass reinforcement and perpendicular to the main portion of carcass reinforcement, and the straight line passing through the end of the turned-back portion of carcass reinforcement and perpendicular to the main portion of carcass reinforcement. This minimum distance makes it possible to guarantee a minimal area of contact between the turned-back portion of carcass reinforcement and the transition element and to guarantee that the turned-back end of carcass reinforcement is covered, bearing in mind the tolerances on the radial positioning of the end of the turned-back portion of carcass reinforcement that are inherent to the manufacturing method.

It is also advantageous to have the distance between the radially internal end of the transition element and the end of the turned-back portion of carcass reinforcement at most equal to 6 times the distance between the end of the turned-back portion of carcass reinforcement and the main portion of carcass reinforcement. This is because the portion of transition element beyond this maximum distance firstly increases the dissipation of heat in the bead, which is damaging to the bead, and secondly is not needed either for ensuring adhesion between the turned-back portion of carcass reinforcement and the transition element or for compensating for the uncertainty regarding the radial positioning of the end of the turned-back portion of carcass reinforcement, thus leading to needless additional cost of transition polymer material.

One advantageous embodiment of the invention is to have the elastic modulus at 10% elongation of the transition polymer material at least equal to 0.9 times and at most equal to 1.1 times the arithmetic mean of the respective elastic moduli at 10% elongation of the edge-binding polymer material and of the filler polymer material. This range of values for the elastic modulus at 10% elongation of the transition polymer material guarantees a gradient of rigidities between the respective edge-binding, transition and filler compounds allowing a significant reduction in the rate at which cracks spread, as compared with the bead of the reference tire that has no transition element, when the cracks spread from the edge-binding polymer material to the transition polymer material and then to the filler polymer material.

BRIEF DESCRIPTION OF THE DRAWINGS

The features of the invention will be more readily understood with the aid of the description of attached FIGS. 1 and 2:

To make them easier to understand, FIGS. 1 and 2 are not drawn to scale.

DETAILED DESCRIPTION OF THE DRAWINGS

Figure 1:
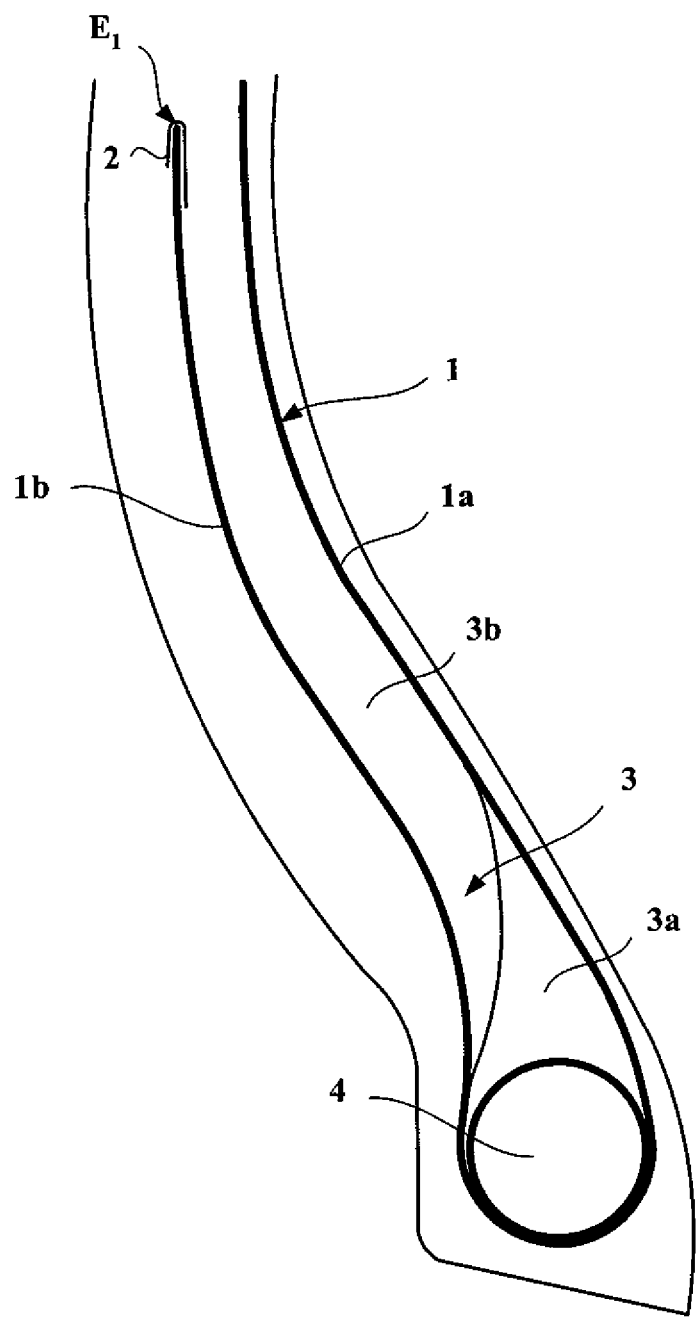
FIG. 1 is a view in cross section on a meridian plane of the bead of a tire for a heavy vehicle of the civil engineering type of the prior art.

FIG. 1 depicts a bead of a tire for a heavy vehicle of the civil engineering type of the prior art, comprising:

a carcass reinforcement comprising a single layer of carcass reinforcement 1 consisting of metal reinforcing elements coated in a coating polymer material, with a main portion of carcass reinforcement 1a wound, from the inside towards the outside of the tire, around a bead wire core 4 to form a turned-back portion of carcass reinforcement 1b, an edge-binding element 2 covering the end $E_1$ of the turned-back portion of carcass reinforcement 1b on its two, respectively axially internal and axially external, faces, and made of an edge-binding polymer material of the same chemical composition as the coating polymer material, a filler element 3 extending the bead wire core 4 radially outwards and having, in any meridian plane, a substantially triangular cross section and being formed of two filler polymer materials, a first filler polymer material 3a being radially on the outside and in contact with the bead wire core 4, and a second filler polymer material 3b being radially on the outside and in contact with the first filler polymer material 3a.

Figure 2:
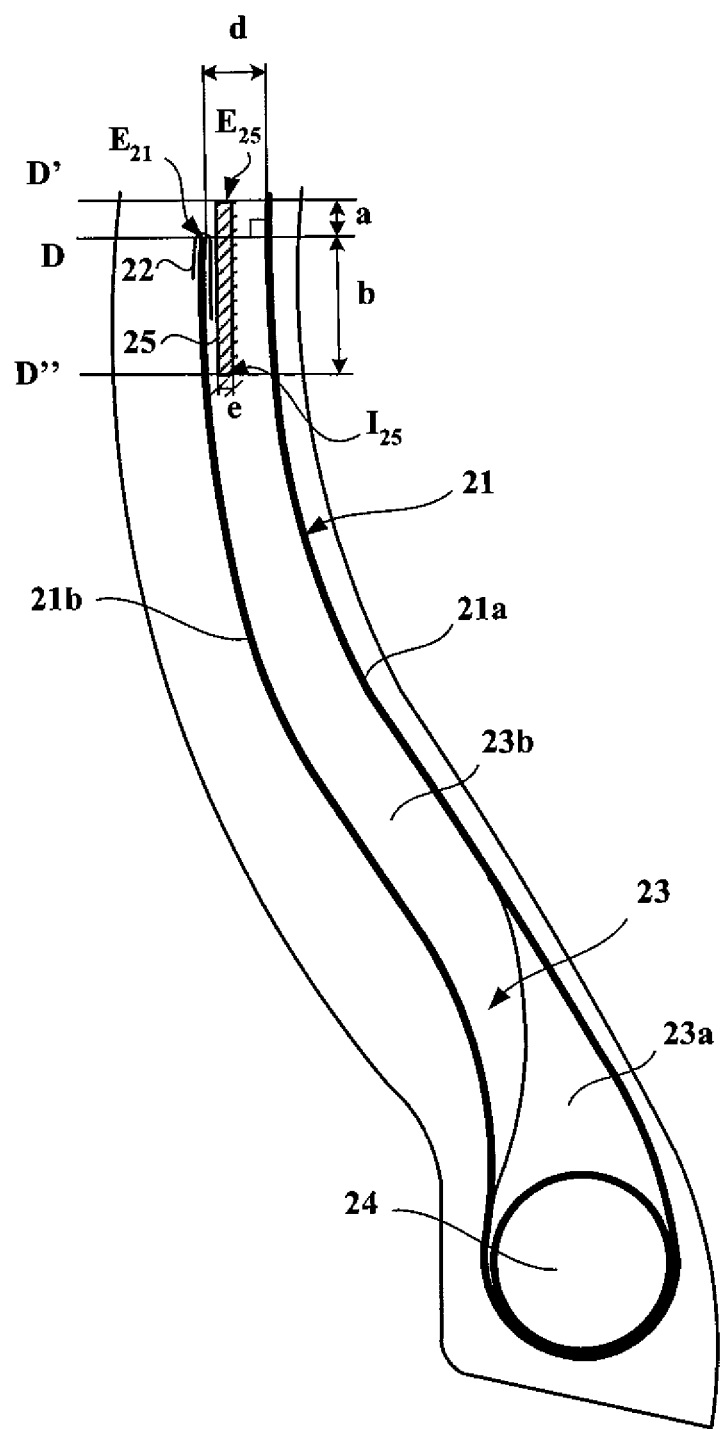
FIG. 2 is a view in cross section on a meridian plane of the bead of a tire for a heavy vehicle of the civil engineering type according to an embodiment of the invention.

FIG. 2 depicts a bead of a tire for a heavy vehicle of the civil engineering type according to the invention, comprising:

a carcass reinforcement comprising a single layer of carcass reinforcement 21 consisting of metal reinforcing elements coated in a coating polymer material, with a main portion of carcass reinforcement 21a wound, from the inside towards the outside of the tire, around a bead wire core 24 to form a turned-back portion of carcass reinforcement 21b, an edge-binding element 22 covering the end $E_{21}$ of the turned-back portion of carcass reinforcement 21b on its two, respectively axially internal and axially external, faces, and made of an edge-binding polymer material of the same chemical composition as the coating polymer material, a filler element 23 extending the bead wire core 24 radially outwards and having, in any meridian plane, a substantially triangular cross section and being formed of two filler polymer materials, a first filler polymer material 23a being radially on the outside and in contact with the bead wire core 24, and a second filler polymer material 23b being radially on the outside and in contact with the first filler polymer material 23a, a transition element 25 made of a transition polymer material, at least partially in contact, on its axially external face, with the edge-binding polymer material 22 and, on its axially internal face, with a filler polymer material 23b.

The transition element 25 has a thickness e depicted schematically as constant but which in actual fact is usually tapered at the ends $E_{25}$ and $I_{25}$. The length of the transition element 25 is a+b. The end $E_{21}$ of the turned-back portion of carcass reinforcement 21b is positioned radially between the respectively radially external $E_{25}$ and radially internal $I_{25}$ ends of the transition element 25.

The radially external end $E_{25}$ of the transition element 25 is situated at a distance a from the end $E_{21}$ of the turned-back portion of carcass reinforcement 21b. The distance a is the distance between the straight line D', passing through the radially external end $E_{25}$ of the transition element 25 and parallel to the straight line D passing through the end $E_{21}$ of the turned-back portion of carcass reinforcement 21b and perpendicular to the main portion of carcass reinforcement 21a, and the straight line D passing through the end $E_{21}$ of the turned-back portion of carcass reinforcement 21b and perpendicular to the main portion of carcass reinforcement 21a.

The radially internal end $I_{25}$ of the transition element 25 is situated at a distance b from the end $E_{21}$ of the turned-back portion of carcass reinforcement 21b. The distance b is the distance between the straight line D", passing through the radially internal end $I_{25}$ of the transition element 25 and parallel to the straight line D passing through the end $E_{21}$ of the turned-back portion of carcass reinforcement 21b and perpendicular to the main portion of carcass reinforcement 21a, and the straight line D passing through the end $E_{21}$ of the turned-back portion of carcass reinforcement 21b and perpendicular to the main portion of carcass reinforcement 21a.

The distance d between the end $E_{21}$ of the turned-back portion of carcass reinforcement 21b and the main portion of carcass reinforcement 21a is the distance measured, along the straight line D passing through the end $E_{21}$ of the turned-back portion of carcass reinforcement 21b and perpendicular to the main portion of carcass reinforcement 21a, between the axially internal generatrix of the reinforcing elements of the turned-back portion of carcass reinforcement 21b and the axially external generatrix of the reinforcing elements of the main portion of carcass reinforcement 21a.

The invention has been studied more particularly in the case of a tire for a heavy vehicle of the dumper type of the size 59/80R63. According to the European Tire and Rim Organization, the nominal conditions of use of such a tire are an inflation pressure of 6 bar, a static load of 99 tonnes and a distance covered in one hour of between 16 and 32 km. In addition, the design section height H, within the meaning of the ETRTO standard, of such a tire is 1214 mm.

The 59/80R63 tire was designed according to the invention, as depicted schematically in FIG. 2, which means with a tall turned-back portion of carcass reinforcement the end of which is radially positioned in the vicinity of the axial straight line passing through the axially outermost points of the tire.

The distance d between the end $E_{21}$ of the turned-back portion of carcass reinforcement 21b and the main portion of carcass reinforcement 21a is equal to 15 mm. The transition element 25, delineated by its respectively radially external $E_{25}$ and radially internal $I_{25}$ ends has a thickness e of 4.5 mm, i.e. 0.30 times the distance d. The radially external end $E_{25}$ of the transition element 25 is positioned at the distance a equal to 45 mm, i.e. to 3 times the distance d. The radially internal end $I_{25}$ of the transition element 25 is positioned at the distance b equal to 75 mm, i.e. to 5 times the distance d.

The elastic moduli at 10% elongation of the edge-binding 22, transition 25 and filler 23b polymer materials are respectively equal to 6 MPa, 4.8 MPa and 3.5 MPa. Thus the elastic modulus at 10% elongation of the transition polymer material 25 is equal to the arithmetic mean of the respective elastic moduli at 10% elongation of the edge-binding 22 and filler 23b polymer materials.

Finite element calculation simulations have been performed respectively on a reference tire, as depicted in FIG. 1, and on a tire according to the invention, as depicted in FIG. 2. For the reference tire, the elongation of the filler polymer material 3b in the end zone $E_1$ of the turned-back portion of carcass reinforcement 1b, on the axially internal face of the turned-back portion of carcass reinforcement 1b, is equal to 1.4 times the elongation of the edge-binding polymer material 2 in contact therewith, these elongations being parallel to the turned-back portion of carcass reinforcement 21b. Thus, when a crack spreads from the edge-binding polymer material 2 to the filler polymer material 3b, its rate of spread through the filler polymer material 3b increases because of the greater elongation of the filler polymer material 3b by comparison with the edge-binding polymer material 2. For the tire according to the invention, the elongation of the transition polymer material 25, in the end zone $E_{21}$ of the turned-back portion of carcass reinforcement 21b, on the axially internal face of the turned-back portion of carcass reinforcement, is equal to 0.9 times the elongation of the edge-binding polymer material 22. As a result, when a crack spreads from the edge-binding polymer material 22 to the transition polymer material 25, its rate of spread through the transition polymer material 25 decreases because of the lower elongation of the transition polymer material 25 compared with the edge-binding polymer material 22.

The invention should not be interpreted as being restricted to the example illustrated in FIG. 2, but can be extended to other embodiment variants such as, nonexhaustively:

an edge-binding polymer material with a chemical composition different from that of the coating polymer material, an absence of an edge-binding element causing direct contact between the axially external face of the transition element and the coating polymer material of the axially internal face of the turned-back portion of carcass reinforcement, a transition element comprising several layers of transition polymer materials, one in contact with the next and directed radially, a turned-back portion of carcass reinforcement the end of which is positioned radially closer to the bead wire core than is the case in FIG. 2.

The invention claimed is:

1. A tire for a heavy vehicle of the civil engineering type, comprising:
    two beads configured to come into contact with a rim;
    a carcass reinforcement consisting of one carcass reinforcement layer made up of metal reinforcing elements coated in a coating polymer material, said carcass reinforcement layer comprising a main portion which, in each of said two beads, is wound from the inside towards the outside of the tire, around a bead wire core to form a turned-back portion of carcass reinforcement, said turned-back portion comprising an end covered by an edge-binding element made of an edge-binding polymer material; and
    a filler element in each of said two beads, said filler element extending said bead wire core radially outwards, said filler element having, in any meridian plane, a substantially triangular cross section and being made of at least one filler polymer material, said at least one filler polymer material being in contact with said edge-binding element and having an elastic modulus at 10% elongation that is less than the elastic modulus at 10% elongation of said edge-binding polymer material,
    wherein a transition element, made of a transition polymer material, is at least partially in contact, on its axially external face, with said edge-binding polymer material and, on its axially internal face, with a filler polymer material,
    wherein the radially external and radially internal ends of said transition element are respectively radially on the outside of and radially on the inside of said end of said turned-back portion of carcass reinforcement, and
    wherein the elastic modulus at 10% elongation of said transition polymer material is somewhere between the respective elastic moduli at 10% elongation of said edge-binding polymer material and of said filler polymer material with which said transition element is in contact.

2. The tire for a heavy vehicle of the civil engineering type of claim 1, wherein said transition element has a constant thickness that is measured outside of tapering regions at said radially external and radially internal ends of said transition element and wherein said constant thickness of said transition element is at least equal to 0.25 times a distance between said end of said turned-back portion of carcass reinforcement and said main portion of carcass reinforcement, said distance being measured along the straight line that passes through said end of said turned-back portion of carcass reinforcement and is perpendicular to said main portion of said carcass reinforcement.

3. The tire for a heavy vehicle of the civil engineering type of claim 1, wherein said transition element has a constant thickness that is measured outside of tapering regions at said radially external and radially internal ends of said transition element and wherein said constant thickness of said transition element is at most equal to 0.60 times a distance between said end of said turned-back portion of carcass reinforcement and said main portion of carcass reinforcement, said distance being measured along the straight line that passes through said end of said turned-back portion of carcass reinforcement and is perpendicular to said main portion of said carcass reinforcement.

4. The tire for a heavy vehicle of the civil engineering type of claim 1, wherein the distance between said radially external end of said transition element and said end of said turned-back portion of carcass reinforcement is at least equal to 2 times the distance between said end of said turned-back portion of carcass reinforcement and said main portion of carcass reinforcement.

5. The tire for a heavy vehicle of the civil engineering type of claim 1, wherein the distance between said radially external end of said transition element and said end of said turned-back portion of carcass reinforcement is at most equal to 4 times the distance between said end of said turned-back portion of carcass reinforcement and said main portion of carcass reinforcement.

6. The tire for a heavy vehicle of the civil engineering type of claim 1, wherein the distance between said radially internal end of said transition element and said end of the turned-back portion of carcass reinforcement is at least equal to 2 times the distance between said end of said turned-back portion of carcass reinforcement and said main portion of carcass reinforcement.

7. The tire for a heavy vehicle of the civil engineering type of claim 1, wherein the distance between said radially internal end of said transition element and said end of said turned-back portion of carcass reinforcement is at most equal to 6 times the distance between said end of said turned-back portion of carcass reinforcement and said main portion of carcass reinforcement.

8. The tire for a heavy vehicle of the civil engineering type of claim 1, wherein the elastic modulus at 10% elongation of said transition polymer material is at least equal to 0.9 times and at most equal to 1.1 times the arithmetic mean of the respective elastic moduli at 10% elongation of said edge-binding polymer material and of said filler polymer material.

* * * * *